(12) United States Patent
Endo et al.

(10) Patent No.: US 8,973,251 B2
(45) Date of Patent: Mar. 10, 2015

(54) METHOD FOR MANUFACTURING STATOR

(75) Inventors: Yasuhiro Endo, Okazaki (JP);
Tomohiko Miyamoto, Miyoshi (JP);
Hiroaki Urano, Miyoshi (JP); Atomi Arakawa, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 99 days.

(21) Appl. No.: 13/201,174

(22) PCT Filed: Apr. 15, 2009

(86) PCT No.: PCT/JP2009/057564
§ 371 (c)(1),
(2), (4) Date: Aug. 11, 2011

(87) PCT Pub. No.: WO2010/119519
PCT Pub. Date: Oct. 21, 2010

(65) Prior Publication Data
US 2012/0017425 A1 Jan. 26, 2012

(51) Int. Cl.
*H02K 15/02* (2006.01)
*H02K 15/14* (2006.01)
*H02K 5/26* (2006.01)

(52) U.S. Cl.
CPC . *H02K 15/14* (2013.01); *H02K 5/26* (2013.01)
USPC .............................................. 29/596; 29/732

(58) Field of Classification Search
USPC ......... 29/596–598, 732–736; 264/255, 272.2; 310/215, 279
See application file for complete search history.

(56) References Cited

U.S. PATENT DOCUMENTS

| | | | | | |
|---|---|---|---|---|---|
| 3,184,173 | A | * | 5/1965 | Walling | 242/432.6 |
| 3,490,143 | A | * | 1/1970 | Hull | 29/596 |
| 3,787,000 | A | * | 1/1974 | Farnsworth et al. | 242/432.4 |
| 5,062,200 | A | * | 11/1991 | Lanfranco | 29/732 |
| 5,722,154 | A | * | 3/1998 | Dunlap | 29/598 |
| 7,243,414 | B2 | * | 7/2007 | Even | 29/732 |
| 7,415,758 | B2 | * | 8/2008 | Hauser et al. | 29/736 |
| 7,752,741 | B1 | * | 7/2010 | Yang et al. | 29/732 |
| 7,886,426 | B2 | * | 2/2011 | Sakakibara | 29/732 |

FOREIGN PATENT DOCUMENTS

| | | |
|---|---|---|
| CN | 101399471 A | 4/2009 |
| JP | A-58-111356 | 7/1983 |
| JP | A-04-178148 | 6/1992 |
| JP | A-09-261907 | 10/1997 |

(Continued)

OTHER PUBLICATIONS

International Search Report in International Application No. PCT/JP2009/057564; dated Jul. 7, 2009 (with English-language translation).

(Continued)

*Primary Examiner* — Minh Trinh
(74) *Attorney, Agent, or Firm* — Oliff PLC

(57) ABSTRACT

A method of manufacturing a stator wherein a stator core is fixed by a centering jig, and in this state, a fixing hole is formed in a flange portion provided on a fastening ring for the stator core, using a central position as a reference for position, by drilling with a drill. The fixing hole is opened to be located at a distance relative to the central position. In a plan view, the fixing hole is opened at a predetermined central angle interval (for example, intervals of 120°) relative to the central position.

7 Claims, 11 Drawing Sheets

(56) References Cited

FOREIGN PATENT DOCUMENTS

| JP | A-2000-270510 | 9/2000 |
| JP | A-2002-315276 | 10/2002 |
| JP | A-2006-174637 | 6/2006 |
| JP | A-2006-254562 | 9/2006 |
| JP | A-2008-220157 | 9/2008 |
| JP | A-2008-236824 | 10/2008 |
| JP | A-2008-278692 | 11/2008 |

OTHER PUBLICATIONS

Dongkai et al.; "Process for Machining the Thin and Long Enclosure and Stator Core;" *Explosion-Proof Electric Machine*; Jun. 30, 2001; pp. 37-38; China Academic Journal Electronic Publishing House (with English-language Abstract).

Chinese Office Action dated Jul. 12, 2013 from Chinese Patent Application No. 200980158772.5 (English-language translation only).

\* cited by examiner

METHOD FOR MANUFACTURING STATOR

TECHNICAL FIELD

The present invention relates to a stator and a method for manufacturing the same.

BACKGROUND ART

A motor and a generator for serving as a rotating electric machine installed on a vehicle such as an automobile have a rotor and a stator which is in an annular form and arranged annularly around the rotor. In the motor, energizing the stator provides rotation force, while in the generator, rotation of the rotor provides electric current.

The stator has an annular stator core having a stator winding. The stator core is resin-sealed and the resin-sealed stator core is accommodated in a stator case which is referred to as a cooling jacket.

Japanese Patent Laying-Open No. 2006-254562 (PTL 1) listed below discloses a rotating electric machine having a structure in which a stator core is provided with a convex portion, a motor case (corresponding to a stator case) is provided with a concave portion, and the convex portion of the stator core is fitted into the concave portion of the motor case in a manner interposing a mold resin therebetween. The mold resin interposed between the convex portion and the concave portion fixes the convex portion of the stator core in the concave portion, thereby restricting the movement of the stator core relative to the motor case.

Japanese Patent Laying-Open No. 2006-174637 (PTL 2) listed below discloses a method for manufacturing a stator of a rotating electric machine. The method adopts a stator manufacturing method in which a stator core is resin-molded, and according to the disclosed method, a mold resin is injected into a stator case with a convex portion provided on the stator core fitted in a concave portion provided in the inner surface of the stator case. The convex portion of the stator core fitted in the concave portion of the stator case restricts the stator core from being moved by resin-molding pressure in injecting the resin.

CITATION LIST

Patent Literature

PTL 1: Japanese Patent Laying-Open No. 2006-254562
PTL 2: Japanese Patent Laying-Open No. 2006-174637

SUMMARY OF INVENTION

Technical Problem

PTLs 1 and 2 above disclose a technique for restricting a stator core from moving relative to a stator case. The documents, however, disclose nothing about a problem that a positioning hole provided in the stator case experiences a deviation which occurs in a stator manufacturing process.

A stator case is provided with a positioning hole for fixing a rotating electric machine to an external housing. This positioning hole is provided in a flange portion extending outwardly from the stator case. Usually, the positioning hole is provided in a flange portion provided on a fastening ring for a stator core and constituting the stator case.

The fastening ring is fixed relative to the stator core by "shrinkage fitting". More specifically, the fastening ring is first heated to expand the fastening ring, thereby to enlarge the inner diameter of the fastening ring. Inside the fastening ring having the enlarged inner diameter, the stator core is accommodated. Subsequently, the fastening ring is cooled, causing the fastening ring to have a contracted inner diameter. As a result, the fastening ring is fixed onto the outer circumferential surface of the stator core.

Since a fastening ring provided with a positioning hole is thus enlarged by heating and contracted by cooling in a manufacturing process of a stator, a deviation from an originally designed position may occur in the position of the positioning hole. Such enlargement and contraction of the fastening ring can also occur in molding using a mold resin. As a result, it is concerned that a positional deviation of a stator causes degradation of the performance of a rotating electric machine.

The present invention has been made to solve the problems above, and an object of the invention is to provide a stator with a structure which does not cause degradation of the performance of a rotating electric machine and a method for manufacturing the stator.

Solution to Problem

In the method for manufacturing a stator based on the present invention, a method for manufacturing a stator having an annular form and for use in a rotating electric machine includes the steps of positioning and fixing a stator core on a jig such that a central position of the stator core agrees with a rotational axis of a rotating electric machine and forming a fixing hole in a flange portion provided on a fastening ring for the stator core, using the central position as a reference for positioning, with the stator core fixed by the jig.

According to another aspect of the above-indicated method for manufacturing a stator, the step of positioning and fixing the stator core on a jig includes the steps of positioning and fixing a stator core on a centering jig such that the central position of the stator core agrees with the rotational axis of a rotating electric machine and fixing the fastening ring onto an outer circumferential surface of the stator core, with the stator core fixed by the centering jig.

According to another aspect of the above-indicated method for manufacturing a stator, the step of forming the fixing hole in the flange portion includes the step of performing drilling on the flange portion with a drill, using the center position as a reference for positioning.

According to another aspect of the above-indicated method for manufacturing a stator, the step of forming the fixing hole in the flange portion includes the step of fixing a hollow rivet to a pilot hole provided in the flange portion, using the center position as a reference for positioning.

According to another aspect of the above-indicated method for manufacturing a stator, the step of forming the fixing hole in the flange portion includes the step of performing punching on the flange portion by press punching, using the center position as a reference for positioning According to another aspect of the above-indicated method for manufacturing a stator, the step of positioning and fixing the stator core on a jig includes the step of fixing the stator core having an outer circumferential surface fastened by the fastening ring, within a mold for resin-molding.

According to another aspect of the above-indicated method for manufacturing a stator, in the step of forming the fixing hole in the flange portion, the step of performing resin-molding the fixing hole on a pilot hole provided in the flange portion is performed in and simultaneously with the step of resin-molding the stator core fixed within the mold.

The stator based on the present invention is a stator having an annular form and for use in a rotating electric machine, and the stator includes a stator core and a fastening ring fixed onto an outer circumferential surface of the stator core. The fastening ring is provided with a flange portion having a fixing hole formed relative to a central position of the stator core serving as a rotational axis of a rotating electric machine.

According to another aspect of the stator above, the fixing hole is a hole formed by performing drilling on the flange portion.

According to another aspect of the stator above, the fixing hole is a hole formed by fixation of a hollow rivet to a pilot hole provided in the flange portion.

According to another aspect of the stator above, the fixing hole is a hole formed by performing press punching on the flange portion.

According to another aspect of the stator above, the fixing hole is a hole formed by performing resin-molding on a pilot hole provided in the flange portion.

Advantageous Effects of Invention

According to the stator and the method for manufacturing the same based on the present invention, a stator with a structure which does not degrade the performance of a rotating electric machine and a method for manufacturing the stator can be provided.

DESCRIPTION OF EMBODIMENTS

A stator in embodiments based on the present invention will be described hereinafter with reference to the drawings. When any reference to a number, an amount and the like is made in embodiments described below, the scope of the present invention is not necessarily limited to that number, amount and the like unless otherwise specified. In addition, in the description below, the same or corresponding parts have the same reference numbers allotted, and description thereof may not be repeated.

First Embodiment

Figure 1:
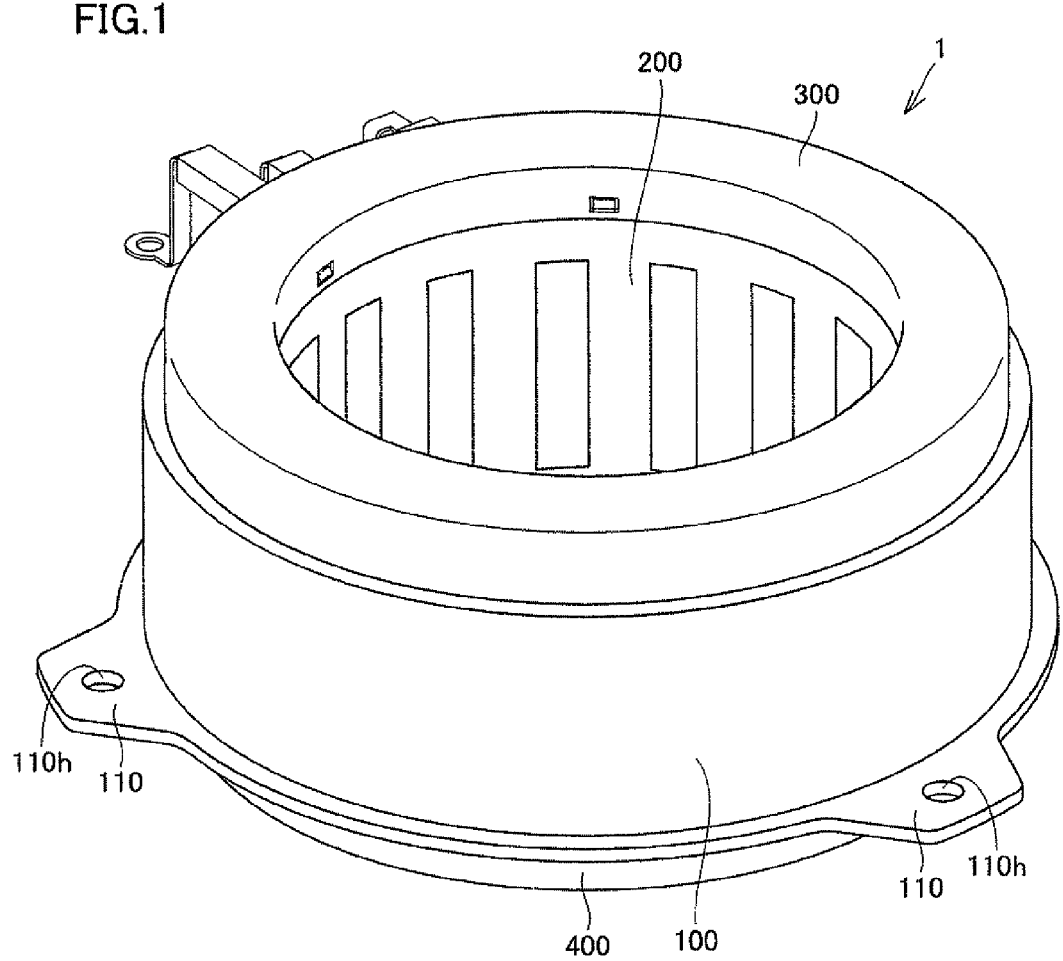
FIG. 1 is an overall perspective view showing a structure of a stator in a first embodiment.
Figure 2:
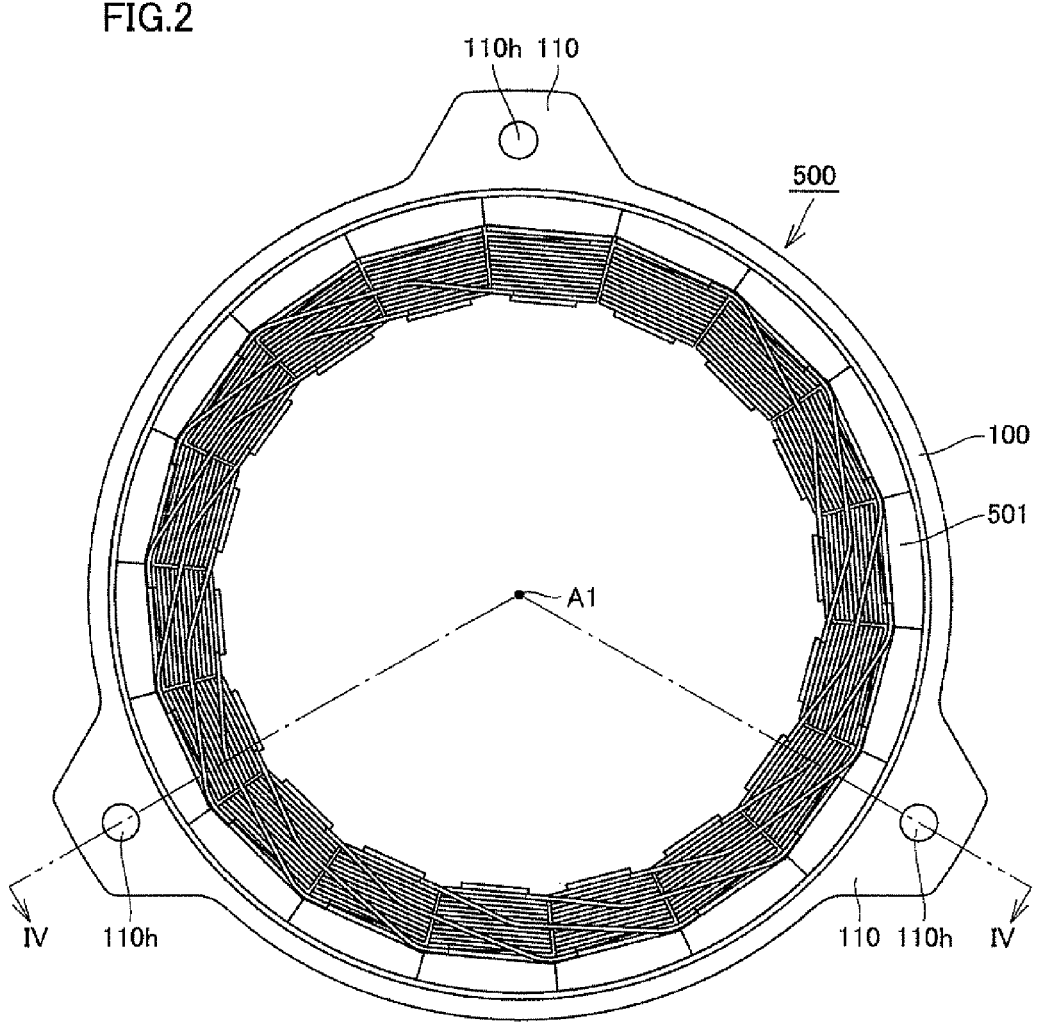
FIG. 2 is a sectional view showing structures of a stator core and a fastening ring in the first embodiment.

Referring to FIGS. 1 and 2, a stator 1 has an annular stator core 501 having a stator winding. Stator core 501 is resin-sealed and the resin-sealed stator core 501 is accommodated in a case which is referred to as a cooling jacket. The cooling jacket is configured of a fastening ring 100 located outside stator core 501, an inner ring 200 located outside stator core 501, and coil end covers 300, 400 located on coil ends at the either end of stator core 501.

As shown in FIG. 2, stator core 501 has the outer circumferential surface onto which fastening ring 100 is fixed. Fastening ring 100 has three points on the circumference of the ring at intervals of 120 degrees, each provided with a flange portion 110 extending outwardly in the radial direction. Each flange portion 110 is provided with a fixing hole 110$h$.

Fixing hole 110$h$ provided in flange portion 110 is provided at an accurate position relative to a central position A1 of stator core 501 serving as a rotational axis of a rotating electric machine. A method for manufacturing a stator including the step of opening fixing hole 110$h$ will be described below. It is noted that sectional views shown in the following FIGS. 3 to 5 correspond to sections taken along a line IV-IV and seen in the direction of arrows in FIG. 2.

Stator Core Positioning Step

Figure 3:
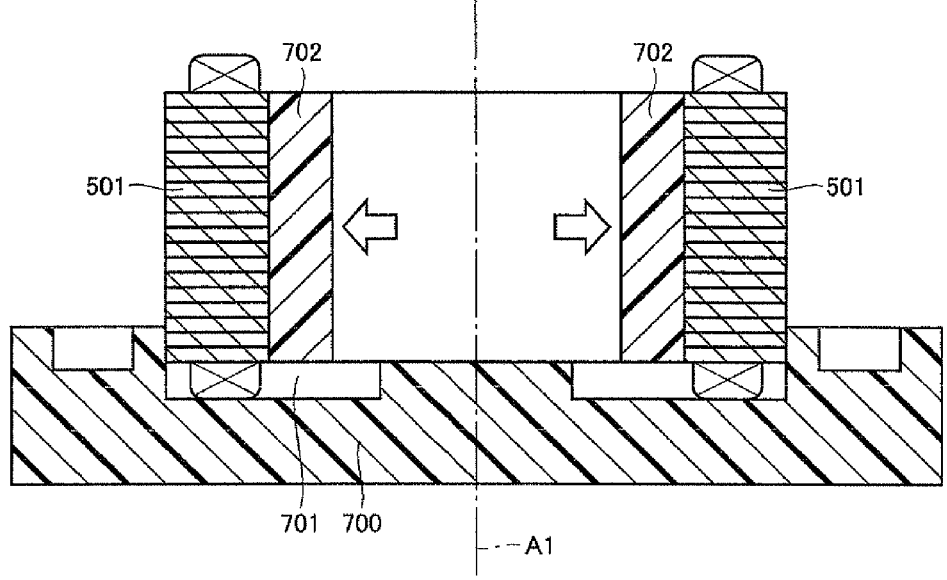
FIG. 3 is a first sectional view showing a method for manufacturing the stator in the first embodiment.

As shown in FIG. 3, stator core 501 is positioned and fixed on a centering jig 700 such that central position A1 of stator core 501 agrees with the rotational axis of a rotating electric machine. Centering jig 700 is provided with an annular concave region 701 for receiving a lower end of stator core 501 and includes an inner diameter retaining member 702 pressing on stator core 501 outwardly in the radial direction from the inner circumferential surface side of stator core 501. Stator core 501 pressed on outwardly by inner diameter retaining member 702 completes positioning of stator core 501.

Fastening Ring Fixing Step

Figure 4:
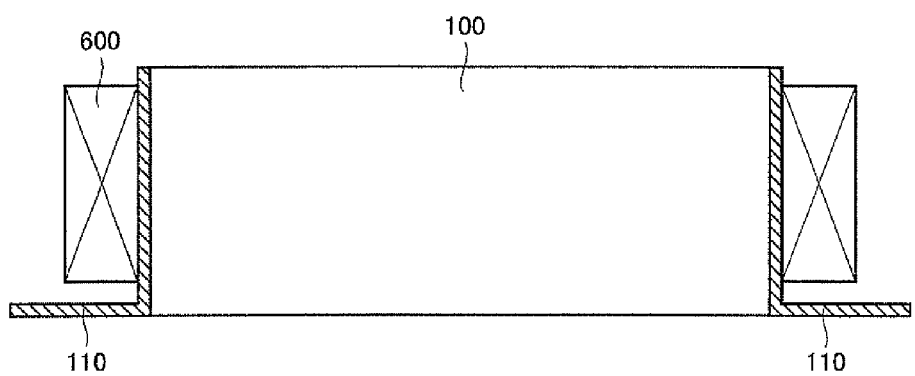
FIG. 4 is a second sectional view showing the method for manufacturing the stator in the first embodiment.

Meanwhile, as shown in FIG. 4, fastening ring 100 is heated by a heater 600 and keeps its inner diameter in an enlarged state. Inside fastening ring 100 with the enlarged inner diameter, stator core 501 is accommodated. Subsequently, fastening ring 100 is cooled, causing fastening ring 100 to have a contracted diameter. As a result, fastening ring 100 is fixed onto the outer circumferential surface of stator core 501.

Fixing Hole Forming Step

Figure 5:
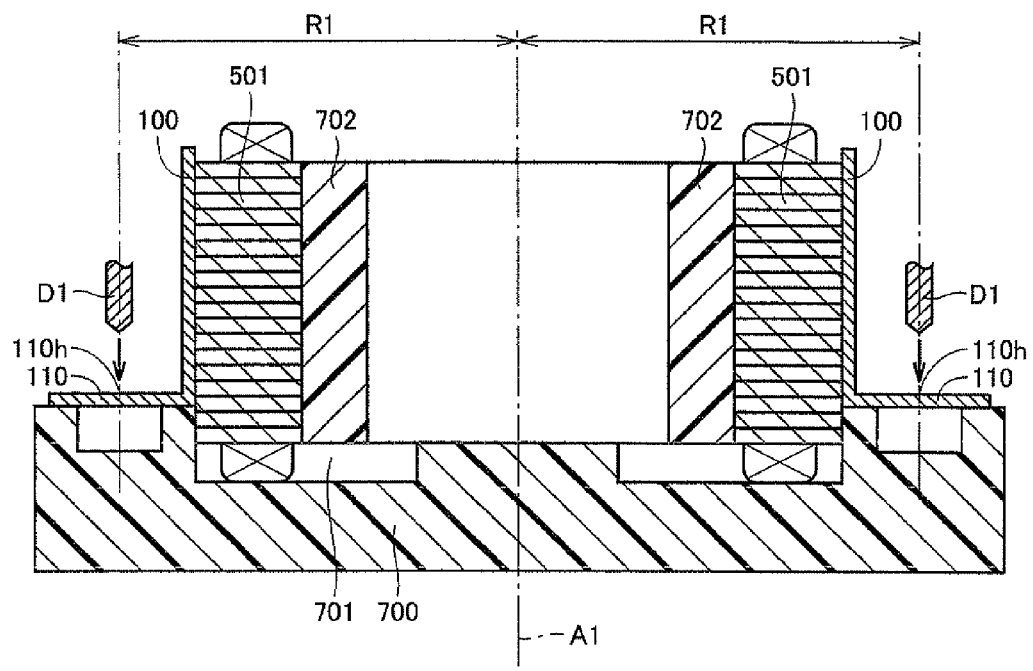
FIG. 5 is a third sectional view showing the method for manufacturing the stator in the first embodiment.
Figure 6:
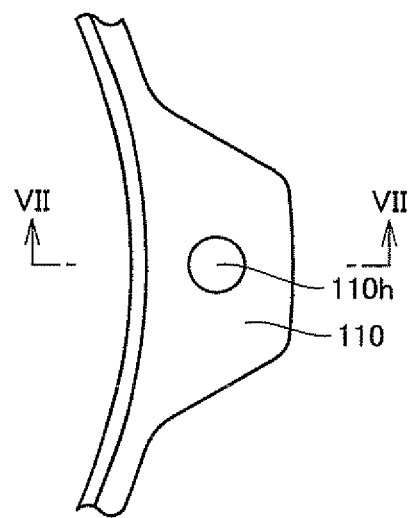
FIG. 6 is a plan view of a positioning hole formed in a flange portion of the fastening ring in the first embodiment.
Figure 7:
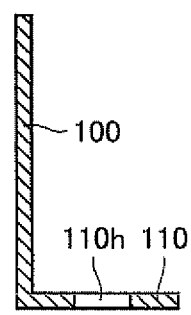
FIG. 7 is a sectional view taken along a line VII-VII and seen in the direction of arrows in FIG. 6.

Next, referring to FIG. 5, with stator core 501 fixed by centering jig 700, fixing hole 110$h$ is formed by drilling with a drill D1 in flange portion 110 provided on fastening ring 100 for stator core 501, using central position A1 as a reference for positioning. As shown in FIGS. 6 and 7, fixing hole 110$h$ is opened to be located at a distance R1 relative to central position A1. In a plan view, the fixing hole 110$h$ is opened at a predetermined central angle interval (for example, intervals of 120°) relative to central position A1.

Function and Effect

In this way, the stator and the method for manufacturing the stator in the first embodiment includes the steps of positioning and fixing stator core 501 on centering jig 700 such that central position A1 of stator core 501 agrees with the rotational axis of a rotating electric machine and forming fixing hole 110$h$ in flange portion 110 provided on fastening ring 100 for stator core 501, using central position A1 as a reference for positioning, with stator core 501 fixed by centering jig 700.

Employment of these steps allows fixing hole 110h to be formed at an accurate position relative to central position A1 without being affected by occurrence of deviation caused by heating and cooling fastening ring 100. Consequently, it is now possible to form a clearance of as-designed value between the stator and a rotor for an air gap, and therefore, an enhanced performance of a rotating electric machine can be achieved. In addition, center misalignment between the stator and the rotor is suppressed, and noise reduction of the rotating electric machine can also be achieved.

Second Embodiment

Figure 8:
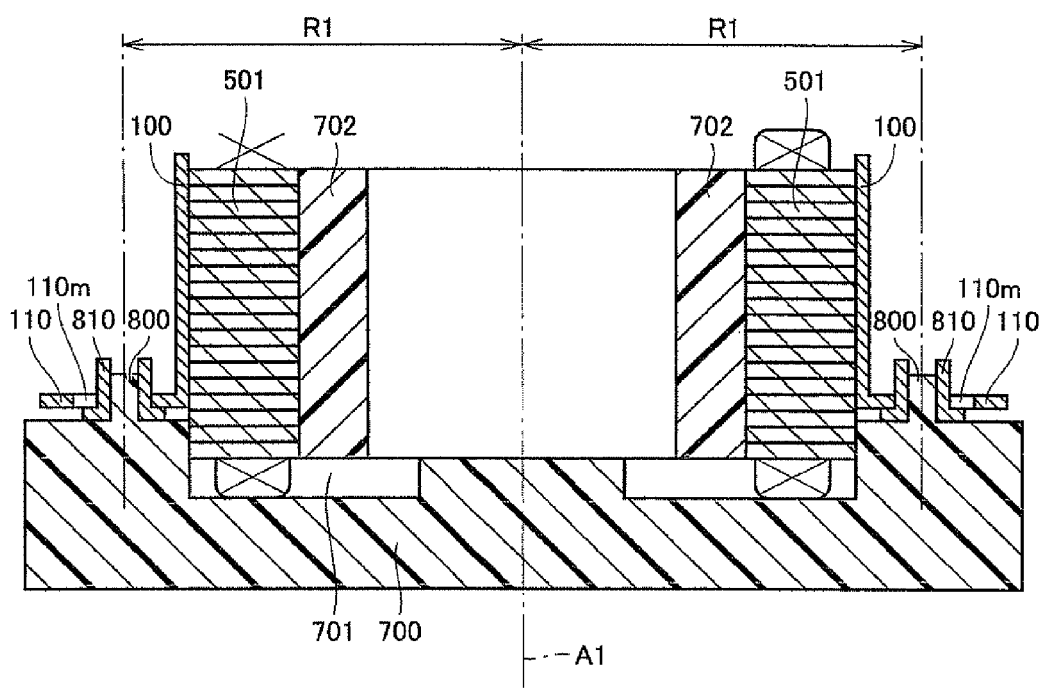
FIG. 8 is a sectional view showing a method for manufacturing a stator in a second embodiment.
Figure 9:
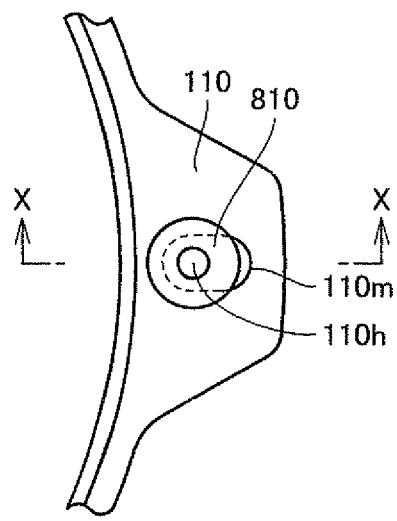
FIG. 9 is a plan view of a positioning hole formed in a flange portion of a fastening ring in a second embodiment.
Figure 10:
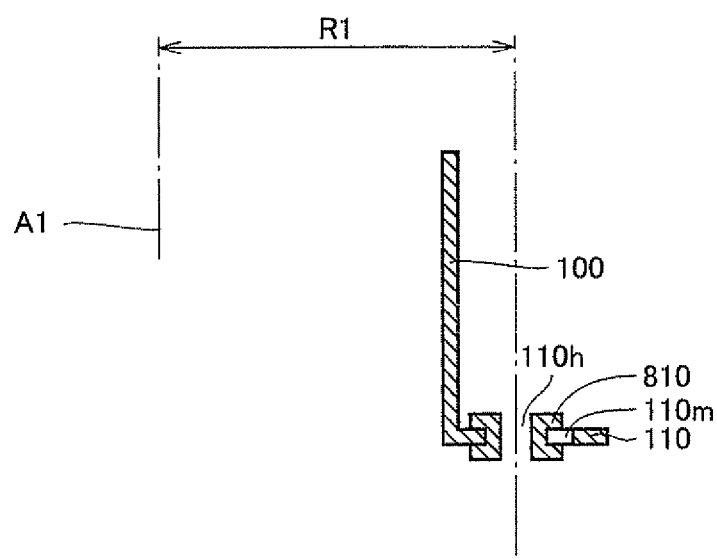
FIG. 10 is a sectional view taken along a line X-X and seen in the direction of arrows in FIG. 9.

Referring to FIGS. 8 to 10, a description will be given below of the stator and the method for manufacturing the same in the present embodiment. The stator in the present embodiment is characterized by having a hole which serves as a fixing hole 110h provided in flange portion 110 provided on fastening ring 100 and which is formed by fixation of a hollow rivet 810 to a pilot hole 110m prepared in flange portion 110. The step of forming fixing hole 110h will be described below. It is noted that steps until fixing fastening ring 100 to a stator core 501 are same as those in the first embodiment described above.

As shown in FIG. 8, on centering jig 700 and exterior to fastening ring 100, a positioning pin 800 is provided in advance at an accurate position relative to central position A1. Hollow rivet 810 is mounted on positioning pin 800. With hollow rivet 810 mounted on positioning pin 800, fastening ring 100 is fixed onto stator core 501. Since flange portion 110 of fastening ring 100 is in advance provided with pilot hole 110m, positioning pin 800 and hollow rivet 810 do not interfere with flange portion 110.

Subsequently, as shown in FIGS. 9 and 10, hollow rivet 810 protruding on a surface of flange portion 110 is subjected to an outwardly folding process (swaging), and fixation of hollow rivet 810 to flange portion 110 is thereby completed. Positioning pin 800 is provided at distance R1 relative to central position A1. Accordingly, fixing hole 110h is opened to be located at distance R1 relative to central portion A1. In a plan view, fixing hole 110h is opened at a predetermined central angle interval (for example, intervals of 120°) relative to central position A1.

In this way, the stator and the method for manufacturing the same in the present embodiment also provide the same function and effects as those in the first embodiment above.

Third Embodiment

Figure 11:
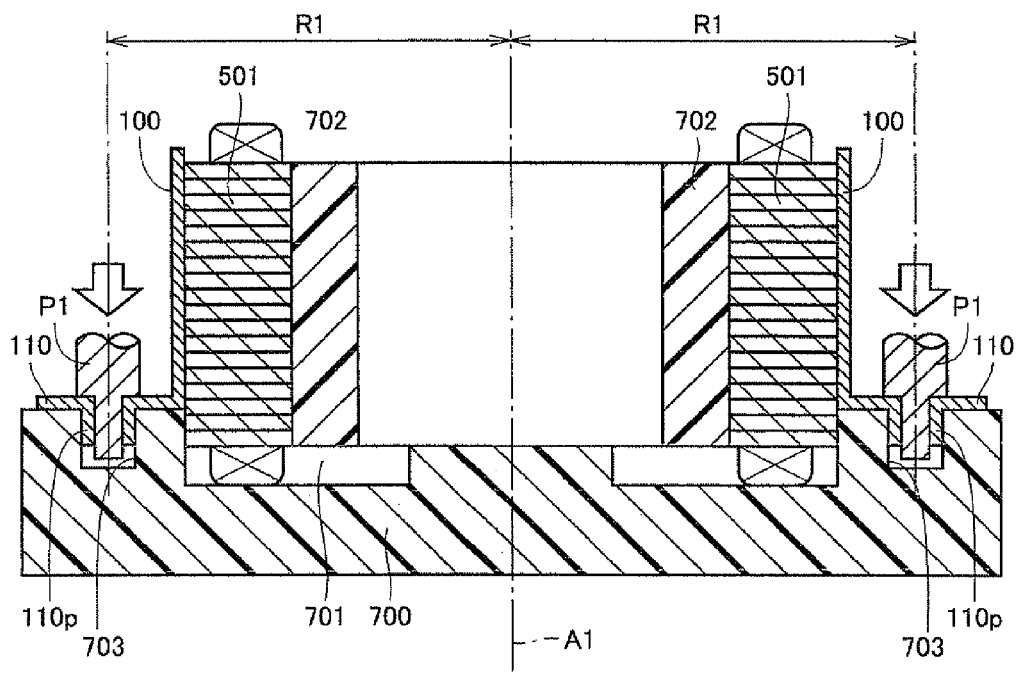
FIG. 11 is a sectional view showing a method for manufacturing a stator in a third embodiment.
Figure 12:
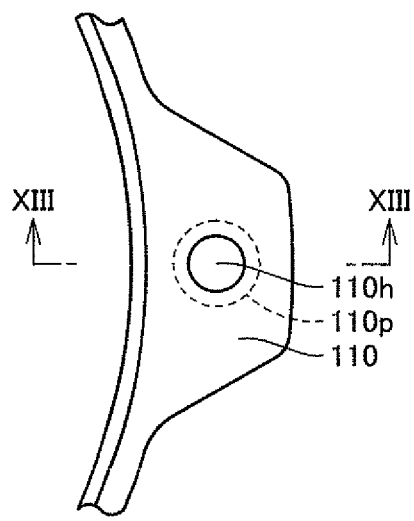
FIG. 12 is a plan view of a positioning hole formed in a flange portion of a fastening ring of the third embodiment.
Figure 13:
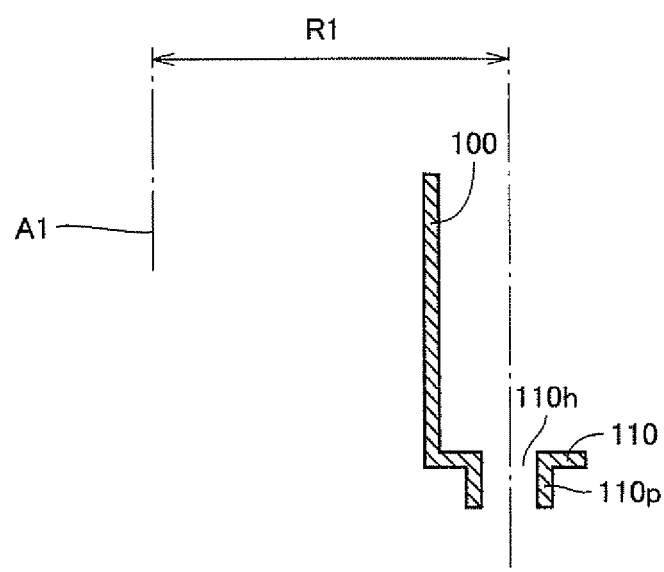
FIG. 13 is a sectional view taken along a line XIII-XIII and seen in the direction of arrows in FIG. 12.

Referring to FIGS. 11 to 13, a description will be given below of the stator and the method for manufacturing the same in the present embodiment. The stator in the present embodiment is characterized by having a hole which serves as a fixing hole 110h provided in flange portion 110 provided on fastening ring 100 and which is formed by performing press punching on flange portion 110. The step of forming fixing hole 110h will be described below. It is noted that steps until fixing fastening ring 100 to a stator core 501 are same as those in the first embodiment described above.

As shown in FIG. 8, in centering jig 700 and exterior to fastening ring 100, a clearance hole 703 is provided in advance at an accurate position relative to central position A1. With flange portion 110 placed on centering jig 700, flange portion 110 is punched through by a punch P1. This results in formation of a punching burr portion 110p in an approximately cylindrical shape as well as formation of fixing hole 110h defined by punching burr portion 110p, as shown in FIGS. 12 and 13.

Clearance hole 703 and punch P1 are provided to be located at distance R1 relative to central position A1. Accordingly, fixing hole 110h is opened to be located at distance R1 relative to central portion A1. In a plan view, fixing hole 110h is opened at a predetermined central angle interval (for example, intervals of 120°) relative to central position A1.

In this way, the stator and the method for manufacturing the same in the present embodiment also provide the same function and effects as those in the first embodiment described above.

Fourth Embodiment

In the methods for manufacturing a stator in the above-described first to third embodiments, the step of fixing fastening ring 100 onto stator core is finished before formation of fixing hole 110h, which allows fixing hole 110h to be formed at an accurate position relative to central position Al without being affected by occurrence of deviation caused by heating and cooling of fastening ring 100.

After formation of fixing hole 110h, however, it is necessary to perform the step of resin-molding the stator core. At this time, in injecting a mold resin, fastening ring 100 is heated and cooled again, and consequently, a positional deviation of fixing hole 110h may occur. In such a case, a hole formed by performing resin-molding on pilot hole 110m may be used as fixing hole 110h, as shown below.

Figure 14:
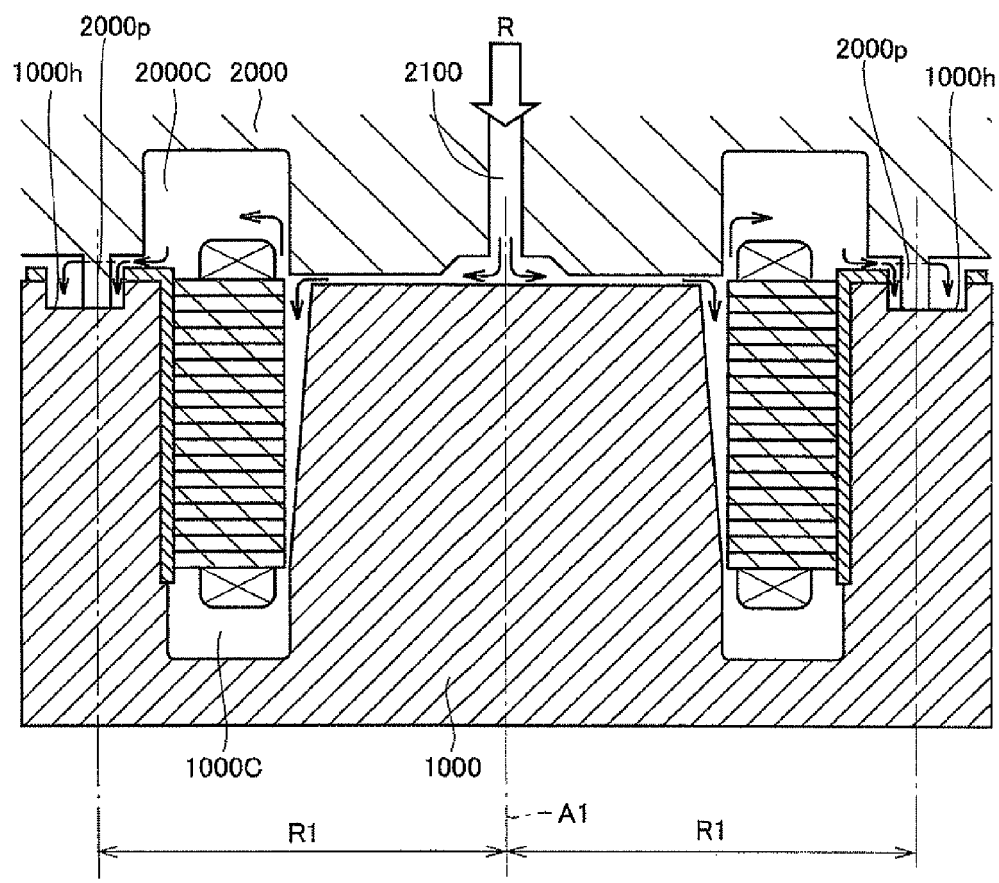
FIG. 14 is a sectional view showing a method for manufacturing a stator in a fourth embodiment.

As shown in FIG. 14, in the step of positioning and fixing stator core 501 on a jig, stator core 501 having the outer circumferential surface to which fastening ring 100 is fastened is placed within cavities 1000C, 2000C formed by a lower mold 1000 and an upper mold 2000 for resin-molding.

Lower mold 1000 and upper mold 2000 have portions circumferentially outward to fastening ring 100 which are provided with a resin introducing concave portion 1000h and a hole forming pin 2000p, respectively. Resin introducing concave portion 1000h is located below pilot hole 110m provided in flange portion 110, and hole forming pin 2000p is provided to pass through pilot hole 110m and abut on the base of resin introducing concave portion 1000h. Further, hole forming pin 2000p is provided at an accurate position relative to central portion A1.

Figure 15:
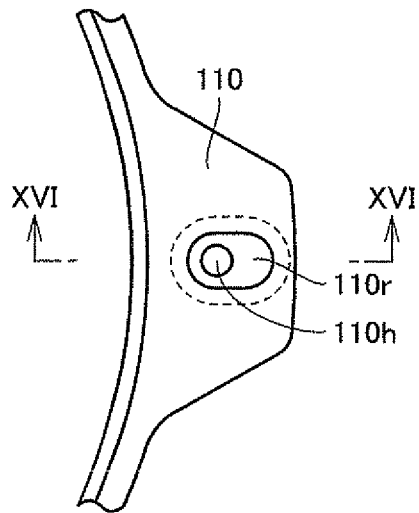
FIG. 15 is a plan view showing a positioning hole formed in a flange portion of a fastening ring in the fourth embodiment.
Figure 16:
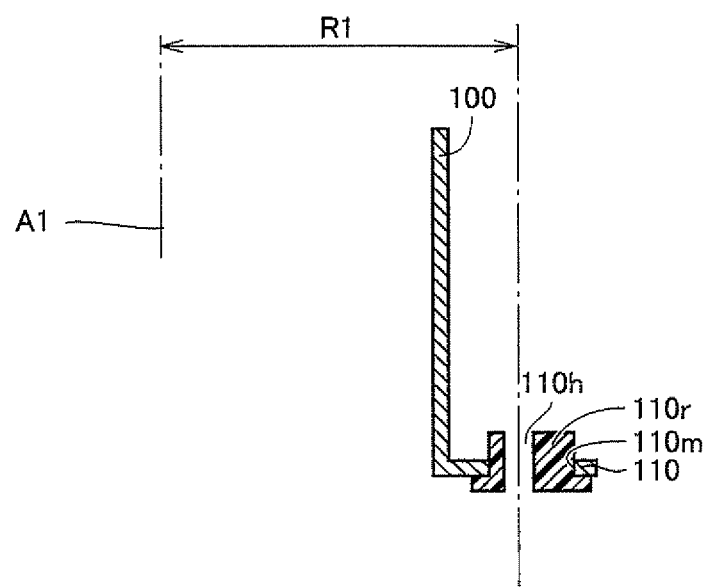
FIG. 16 is a sectional view taken along a line XVI-XVI and seen in the direction of arrows in FIG. 12.

In the above-described configuration, introduction of a resin through a resin introducing conduit 2100 into cavities 1000C, 2000C results in that the resin is also introduced around hole forming pin 2000p. As a result, pilot hole 110m provided in flange portion 110 is covered with a resin 110r, while fixing hole 110h is formed in a region where hole forming pin 2000p is located, as shown in FIGS. 15 and 16.

Hole forming pin 2000p is provided to be located at distance R1 relative to central position A1. Accordingly, fixing hole 110h is opened to be located at distance R1 relative to central portion A1. In a plan view, fixing hole 110h is opened at a predetermined central angle interval (for example, intervals of 120°) relative to central position A1.

As such, according to the stator and the method for manufacturing the same in the present embodiment, since fixing hole 110h is concurrently formed with the step of resin-molding the stator core, fixing hole 110h can be formed at an accurate position relative to central position A1, without being affected by occurrence of deviation caused by heating and cooling of fastening ring 100 and by occurrence of deviation caused by heating and cooling in resin-molding. As a result, it is now possible to form a clearance of as-designed value between the stator and a rotor for an air gap, and therefore, an enhanced performance of a rotating electric machine can be achieved. In addition, center misalignment between the stator and the rotor is suppressed, and noise reduction of the rotating electric machine can be achieved.

While the embodiments of the present invention have been described as above, it should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST 1 stator; 100 fastening ring; 110 flange portion; 110h fixing hole; 110m pilot hole; 110p punching burr portion; 110r resin; 200 inner ring; 300, 400 coil end cover; 501 stator core; 600 heater; 700 centering jig; 701 concave region; 702 inner diameter retaining member; 703 clearance hole; 800 positioning pin; 810 hollow rivet; 1000C, 2000C cavity; 1000h resin introducing concave portion, 2000p hole forming pin; 2100 resin introducing conduit; A1 central position; D1 drill; P1 punch

The invention claimed is:

1. A method for manufacturing a stator having an annular form and for use in a rotating electric machine, comprising the steps of:
   positioning and fixing a stator core on a jig such that a central position of said stator core agrees with a rotational axis of a rotating electric machine,
      wherein said step of positioning and fixing said stator core on the jig includes a step of positioning and fixing said stator core on a centering jig such that said central position of said stator core agrees with a rotational axis of a rotatin electric machine;
   forming a fixing hole in a flange portion provided on a fastening ring for said stator core, using said central position as a reference for positioning, with said stator core fixed by said jig; and
   fixing said fastening ring to said stator core by shrinkage fitting,
      wherein said step of fixing said fastening ring includes fixing said fastening ring onto an outer circumferential surface of said stator core, with said stator core fixed by said centering jig.

2. The method for manufacturing a stator according to claim 1, wherein
   said step of forming said fixing hole in said flange portion includes the step of performing drilling on said flange portion with a drill, using said center position as a reference for positioning.

3. The method for manufacturing a stator according to claim 1, wherein
   said step of forming said fixing hole in said flange portion includes the step of fixing a hollow rivet to a pilot hole provided in said flange portion, using said center position as a reference for positioning.

4. The method for manufacturing a stator according to claim 1, wherein
   said step of forming said fixing hole in said flange portion includes the step of performing punching on said flange portion by press punching, using said center position as a reference for positioning.

5. The method for manufacturing a stator according to claim 1, wherein
   said step of positioning and fixing said stator core on a jig includes the step of fixing said stator core having an outer circumferential surface fastened by said fastening ring, within a mold for resin-molding.

6. The method for manufacturing a stator according to claim 5, wherein
   in said step of forming said fixing hole in said flange portion, a step of performing resin-molding on said fixing hole on a pilot hole provided in said flange portion occurs simultaneously with a step of performing resin-molding on said stator core fixed within said mold.

7. A method for manufacturing a stator having an annular form and for use in a rotating electric machine, comprising the steps of:
   positioning and fixing a stator core on a jig such that a central position of said stator core agrees with a rotational axis of a rotating electric machine; and
   forming a fixing hole in a flange portion provided on a fastening ring for said stator core, using said central position as a reference for positioning, with said stator core fixed by said jig, wherein:
   said step of positioning and fixing said stator core on a jig includes the step of fixing said stator core having an outer circumferential surface fastened by said fastening ring, within a mold for resin-molding, and
   in said step of forming said fixing hole in said flange portion, a step of performing resin-molding on said fixing hole on a pilot hole provided in said flange portion occurs simultaneously with a step of performing resin-molding on said stator core fixed within said mold.

* * * * *